United States Patent
Sloan

(10) Patent No.: US 6,215,955 B1
(45) Date of Patent: *Apr. 10, 2001

(54) HEATING/DRYER SYSTEM FOR USE IN REPAIRING CHIPS IN GLASS

(75) Inventor: Thomas F. Sloan, Olney, IL (US)

(73) Assignee: Liquid Resins International, Ltd., Olney, IL (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/288,086

(22) Filed: Apr. 2, 1999

(51) Int. Cl.[7] .................................. F24H 3/00; B60S 1/54
(52) U.S. Cl. .............................. 392/383; 219/202; 34/90; 34/443
(58) Field of Search ...................................... 395/383–385, 395/379, 382; 219/203, 522; 34/443, 90, 91, 95, 143, 112, 121; 15/405

(56) References Cited

U.S. PATENT DOCUMENTS

| | | | |
|---|---|---|---|
| 981,641 | * 1/1911 | Halliwell | 392/385 |
| 2,121,753 | * 6/1938 | Cornell, Jr. | 219/203 |
| 2,121,754 | * 6/1938 | Cornell, Jr. | 392/383 |
| 2,432,067 | * 12/1947 | Morse | 392/385 |
| 2,511,139 | * 6/1950 | Yeamans | 392/365 |
| 2,597,215 | * 5/1952 | Wright et al. | 392/383 |
| 2,675,459 | * 4/1954 | Pace | 34/90 |
| 3,115,567 | * 12/1963 | Meltzer | 392/382 |
| 3,209,127 | * 9/1965 | Graves | 392/385 |
| 3,211,890 | * 10/1965 | Graves | 392/385 |
| 3,418,452 | * 12/1968 | Grabner | 392/383 |
| 3,841,932 | 10/1974 | Forler et al. . | |
| 3,857,016 | * 12/1974 | Meyer et al. | 392/383 |
| 3,939,850 | * 2/1976 | Wahl | 34/96 |
| 4,366,368 | * 12/1982 | Stephens, III | 392/385 |
| 4,524,263 | * 6/1985 | Yamac | 392/384 |
| 4,757,183 | * 7/1988 | Karey et al. | 392/385 |
| 4,872,238 | 10/1989 | Crotts et al. . | |
| 5,058,193 | * 10/1991 | Appierto | 392/384 |
| 5,074,056 | 12/1991 | Werner . | |
| 5,095,639 | 3/1992 | Slavin, Jr. . | |
| 5,155,924 | * 10/1992 | Smith | 392/379 |
| 5,251,281 | 10/1993 | Fravel, Jr. . | |
| 5,620,440 | * 4/1997 | Heckele et al. | 606/28 |
| 5,670,180 | 9/1997 | Mackey et al. . | |
| 5,875,562 | * 3/1999 | Fogarty | 392/385 |

FOREIGN PATENT DOCUMENTS

199144 * 10/1986 (EP) .
2012582 * 8/1979 (GB) .

* cited by examiner

Primary Examiner—John A. Jeffery
(74) Attorney, Agent, or Firm—Haverstock, Garrett & Roberts LLP

(57) ABSTRACT

The heating/dryer apparatus includes a casing having a top and a bottom, a heating element inside a tubular member incorporated in the casing and frictionally engaged therewith, a fan incorporated in a housing in the casing located above the heating element, feet attached to the bottom of the casing and an electrical extension adapted to activate the heating element and the fan. The heating/dryer apparatus may be mounted on the end of a flexible arm attached to a mounting device having a base with a suction cup mounted therein.

3 Claims, 3 Drawing Sheets

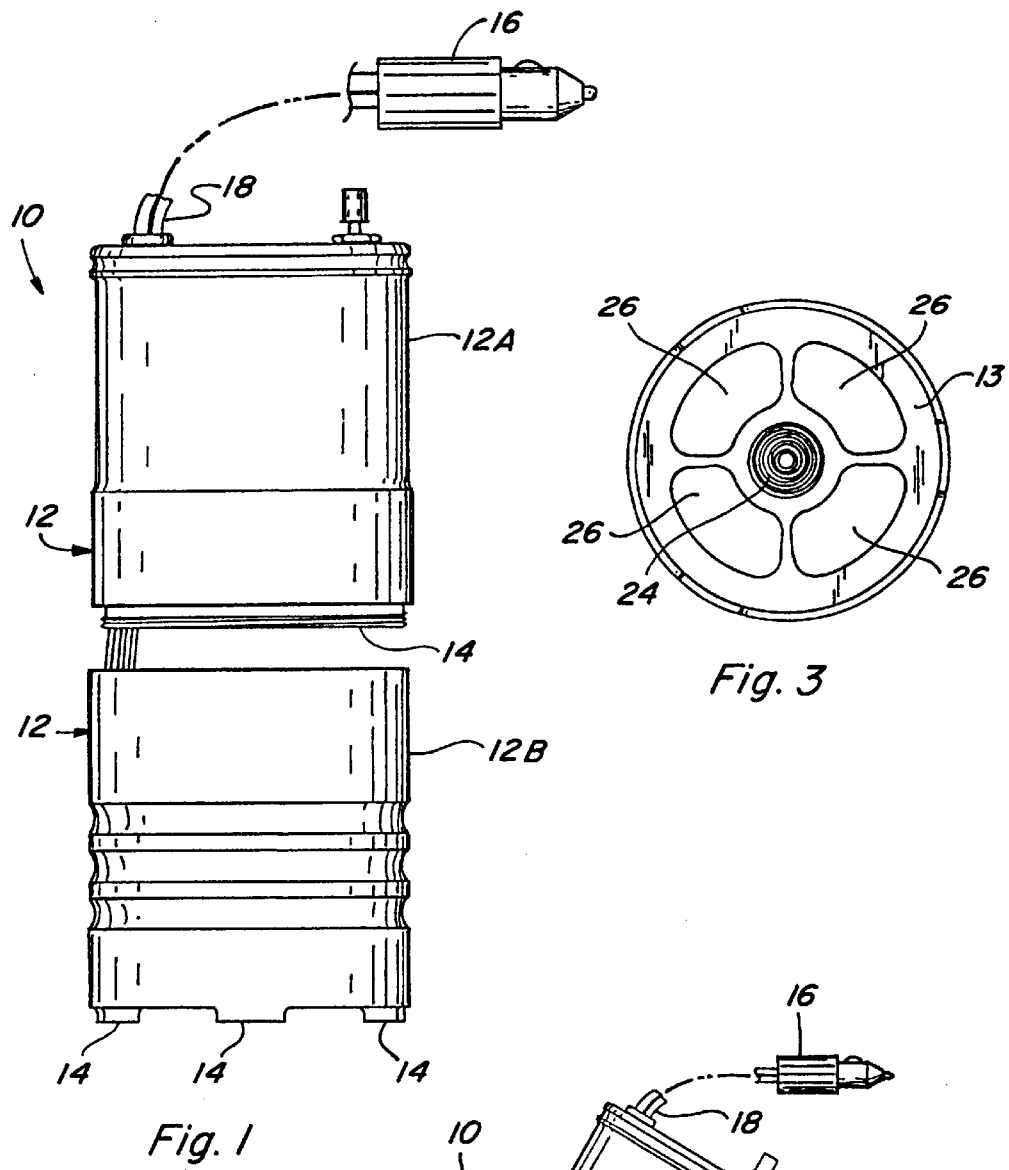
Fig. 1
Fig. 3
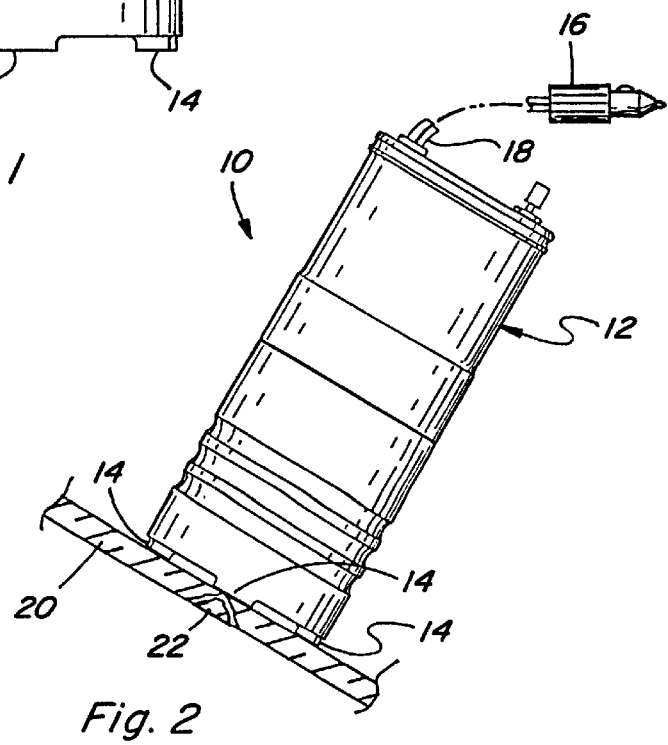
Fig. 2

HEATING/DRYER SYSTEM FOR USE IN REPAIRING CHIPS IN GLASS

FIELD OF INVENTION

The present invention relates generally to an apparatus and method for cleaning and drying chips in glass in preparation for repairing the chips.

BACKGROUND OF INVENTION

The present heating/dryer apparatus is specifically adapted for use in repairing chips in glass such as windshields and the like. It is uniquely adapted to decrease the time necessary for repairing chips for subsequent treatment. U.S. Pat. No. 5,095,639 discloses a method of drying windshield shatter crack cavities using a hand-held radiant heating device. U.S. Pat. No. 5,670,180 discloses another laminated glass and windshield repair device wherein the resin material is cured and hardened by exposing the resin to ultra-violet light. U.S. Pat. No. 5,074,056 discloses a device for drying windshield breaks utilizing dry air. U.S. Pat. No. 3,841,932 discloses a method and apparatus for repairing cracks in windshields. The present apparatus includes components which combine to provide for faster preparation of chips in glass for repair.

SUMMARY OF INVENTION

Before a chip in glass can be repaired, it must be cleaned and dried. Cleaning and drying, even with solvents, traditionally takes about fifteen (15) minutes. Utilizing the heating/dryer apparatus of this invention reduces the time necessary for preparing the chip for repair to no more than one (1) to two (2) minutes. Thus, there is a tremendous economic benefit to using the apparatus of this invention.

The heating/dryer apparatus of this invention includes a casing with a heating element incorporated into a tubular member inside the casing and with a fan immediately above the heating element adapted to move heated air rapidly through the apparatus to quickly dry the chip which has been previously treated with water and/or a solvent such as alcohol or a hydrocarbon solvent to remove any loose chips or other debris and to condition the chip for treatment with a resin injecting system, such as that disclosed in U.S. Pat. No. 4,995,798. The casing of the apparatus of this invention includes a bottom portion with projections designed to retain the apparatus for positioning on a windshield, slightly removed from the surface of the windshield and the chip so that the air that traverses the apparatus can be quickly dissipated into the atmosphere. The bottom of the casing includes openings surrounding the heating element which are adjacent to the periphery between the legs which hold the apparatus slightly removed from the windshield. The top of the casing which houses the heating element and a fan also includes openings whereby air can be sucked into the apparatus and then passed onto the chip in heated condition in order to quickly remove any cleaning material from the chip. Using heated air is particularly useful when the chip is being cleaned with a solvent which has a low temperature of evaporation and which may be mixed with water. The heating element is recessed in a tubular member to project the heat from the heating element in a compact pattern and to avoid damage to the heating element when in service.

The fan unit is individually housed in a circular chamber housing which is frictionally engaged with the inside of the casing and which can be quickly snapped into and out of position in the casing. Preferably, the casing is made from two (2) component parts which may be connected by threads and grooves or by a snap-in system so that the fan and heating element are quickly and readily available for instant replacement when one or both become inoperable from use.

The heating element and the fan are actuated by means of an electric current, which is generally a twelve volt system with an adapter plug suitable for insertion in a cigarette lighter unit in an automobile. Other electrical sources may be utilized, such as a separate battery system or a 120 volt system which would require a converter which reduces the power source to 12 volts for use in the preferred embodiment of this invention. Obviously, it would be possible to utilize 110–120 volt systems of electricity, but this would requiring using a heating element and fan adapted for that voltage.

In summary, the heating/dryer apparatus of this invention uses forced heated air to quickly dry chips in glass, usually in less than two minutes. It takes only approximately 15 seconds for the apparatus to reach full operating temperature. The apparatus of this invention can be used also to repair stress line cracks in windshields which might require more than one resin injection. The controlled system of this invention enables the use of the apparatus to prepare elongated cracks without extending the cracks, because the heated air can be carefully controlled and dissipated rapidly which avoids creating further stress lines. The heating/dryer apparatus of this invention may also include an insulating material such as asbestos or fiber glass around the lower portion of the casing close to the heating element. However, such insulation is generally not necessary for use by experienced crack repairers. The apparatus of this invention is most useful when used with the chip repair equipment defined in U.S. Pat. No. 4,995,798, entitled APPARATUS FOR WINDSHIELD REPAIR, and U.S. Pat. No. 5,028,223, entitled MAGNETICALLY ATTACHED SUPPORT DEVICE FOR WINDSHIELD REPAIR APPARATUS which are presently owned, along with this application, by Liquid Resins International, Ltd.

BRIEF DESCRIPTION OF THE DRAWINGS

FIG. 1 is a side elevation of the apparatus of this invention showing the casing in two parts.

FIG. 2 is a side elevation of the heating/dryer apparatus of this invention in place on glass with a chip.

FIG. 3 is a bottom plan view of the casing showing the openings adjacent to the interstices between the feet.

DESCRIPTION OF THE PREFERRED EMBODIMENT

Figure 4:
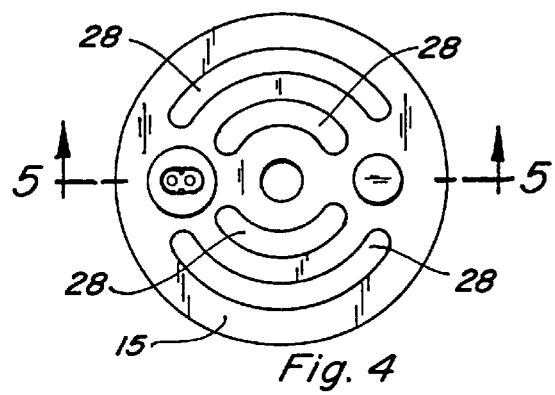
FIG. 4 is a top plan view of the apparatus of this invention showing the interstices through which atmospheric air is sucked into the housing prior to being heated and forced out onto the chip being dried.

Referring to the drawings, more particularly by reference numbers, wherein like numerals refer to like parts, number 10 in FIGS. 1, 2, and 5–7 identifies the heating/dryer apparatus of the present invention.

The heating/dryer apparatus 10 includes casing 12 which is preferably made from steel. However, casing 12 may be constructed from aluminum, nickel alloys, or from high performance plastics such as polycarbonates, nylons, acrylic resins, and other ridge plastic materials.

With reference to FIG. 1, casing 12 is shown as components 12A and 12B. Casing component 12A includes male threads 14 adapted to mate with female threads (not shown) in casing component 12B, in order to create casing 12 in locked position for service.

FIGS. 1, 2 and 5–7 show feet 14 which are an important part of heating/dryer apparatus 10 to provide a constant and even flow of heated air over the chip being cleaned for repair.

FIGS. 1, 2 and 5–7 show electrical connector 16 with connecting cord 18.

FIG. 2 shows heating/dryer apparatus 10 in position on glass 20 and over chip 22.

FIG. 3 is a bottom plan view of casing 12 showing bottom surface 13 and heating element 24 surrounded by openings 26 which are adapted to project heated air onto chip 22 in a uniform pattern.

FIG. 4 is a top plan view of casing 12 showing top surface 15 with interstices 28 through which atmospheric air is sucked into the interior of casing 12.

Figure 5:
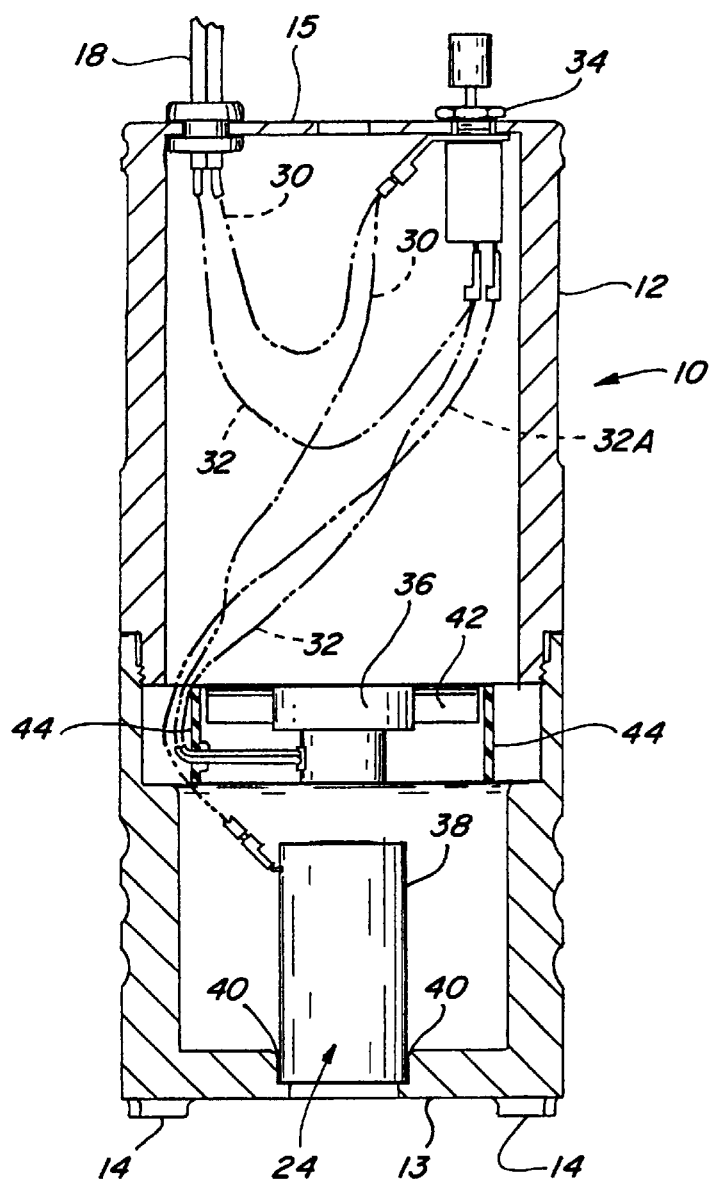
FIG. 5 is an enlarged cross-sectional view taken along the lines 5—5 of FIG. 4.

FIG. 5 is an enlarge cross-sectional view taken along line 5—5 of FIG. 4. Connecting cord 18 includes ground wire 30 and hot wire 32. Heating element 24 is contained inside heating element housing 38 which is held in frictional, but removable, relationship with sleeve opening 40 in casing 12. Fan 36 is shown in fan housing 42 which is also shown in frictional, but removable, relationship with annular ring 44 in casing 12.

In a preferred operation of heating/dryer apparatus 10, switch 34 is a depressable switch which may be used to turn on and off heating element 24 while maintaining fan 36 in constant operation. It is noted from the wiring diagram in FIG. 5 that hot wire 32 is shown connected at switch 34 directly to fan 36 and to heating element 24 through hot wire 32A.

Figure 6:
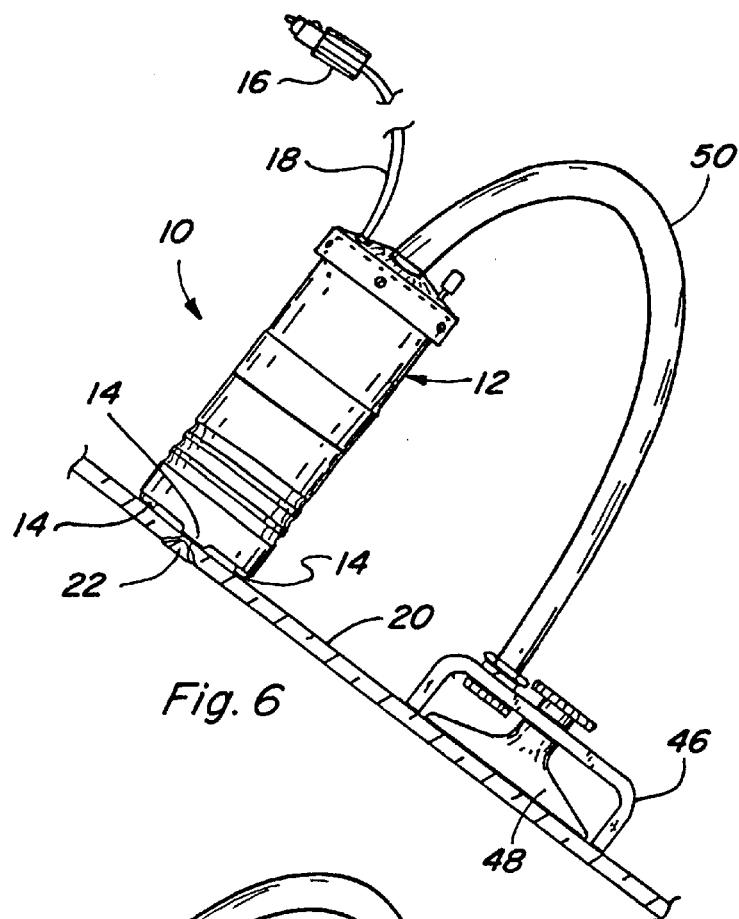
FIG. 6 is a side elevation of one embodiment of this invention showing the heating/dryer apparatus held in place over a windshield with a chip therein wherein the apparatus is attached to a flexible neck which is held in place on the windshield by means of a suction cup.

FIG. 6 is an alternative embodiment of this invention showing heat/dryer apparatus 10 held in place over chip 22 by means of mounting bracket 46 which includes suction cup 48 adapted for holding heating/dryer apparatus 10 in place on glass 20 through flexible neck 50. Casing 12 may be connected to flexible neck 50 by any known attaching means such as a threaded connector.

Figure 7:
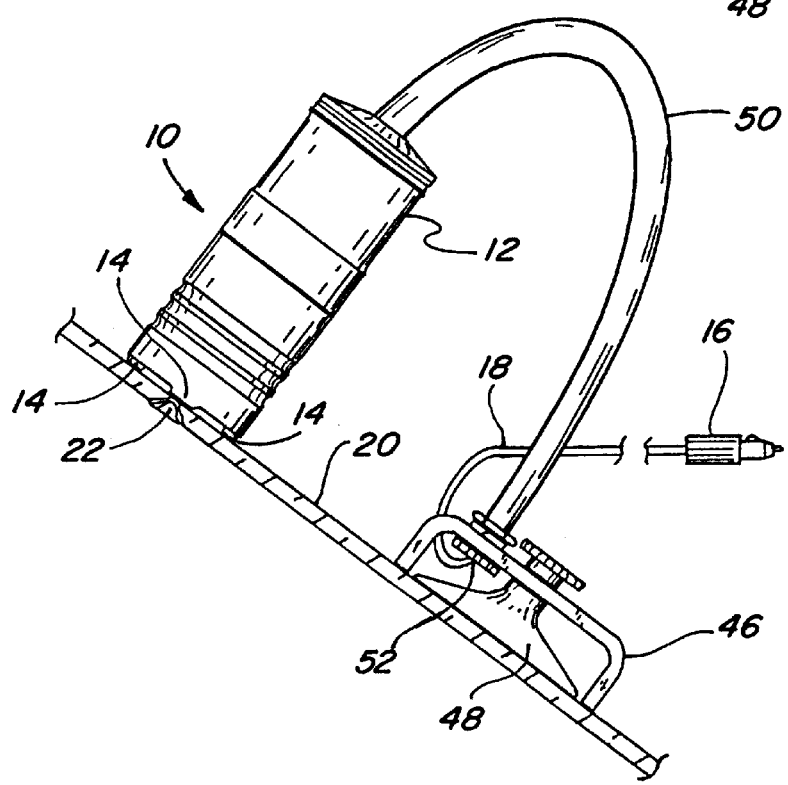
FIG. 7 is a further modification of the invention shown in FIG. 6 wherein the apparatus of this invention is a unitary combination of heating/dryer apparatus coupled with a flexible neck held in place by a suction cup.

FIG. 7 is a further embodiment of the present invention wherein heating/dryer apparatus 10 is shown directly connected to mounting bracket 46 with connecting cord 18 exiting through hole 52 and with connecting cord 18 going directly into casing 12 to actuate heating element 24 and fan 36 without a switch.

In a specific preferred embodiment of this invention, heating element 24 and fan 36 are removable but frictionally retained in steel casing 12 and powered by a 12 volt electrical system. The fan unit is a unitary construction 1.6 inches×1.6 inches×0.5 inches. Casing 12 is designed to encase the fan unit with the four corners tightly abutting the inside of casing 12 in such manner as to be held in place during operation but easily removable for replacement. The frame and impeller are made from reinforced plastic and the bearings are sealed ball bearings. This fan provides an air flow of about 5.5 cubic feet per minute. The lead wires are size AWG26. This preferred fan 36 is manufactured and marketed by Purdy Electronics Corporation of Sunnyvale, Calif. and marketed under the trademark INTERFAN and logo.

In this preferred embodiment of this invention, switch 34 is a spring actuated snap switch manufactured and marketed by C & K Components, Inc. This particular switch 34 must be held in depressed position to activate heating element 24 which enables the operator to rather precisely time the amount of time to complete the chip cleaning operation. Also, using a switch which requires constant pressure to maintain activation of heating element 24, while fan 36 remains in constant operation, avoids any possibility of inadvertently leaving heating element 24 turned on which could result in burned fingers and heating the glass too much which could result in creating additional stress lines in the glass.

Heating element 24 in this preferred embodiment is about 9/16 inch in diameter and about ¼ inch thick and is located inside heating element housing 38 in frictional engagement therewith. The outer surface of heating element 24 is bright nickel plate. After assembly, the friction force between heating element housing 38 and heating element 24 is about 14 to 24 ounces. Current draw for heating element 24 is about 6.0 to 5.3 amperes at 14.2 VDC. Heating element 24 is essentially identical to the heating element contained in the cigarette lighters in many automobiles. It is manufactured and marketed by Cosco Products Company, Bridgeport, Conn.

Thus, there has been shown and described several embodiments of a method and apparatus for cleaning and drying chips in glass in preparation for repairing the chips which satisfy all the objects and advantages set forth above. It will be apparent, however, to those familiar in the art that many changes, variations, modifications and other uses and applications for the subject heating/dryer system are possible. All such changes, variations, modifications and other uses and applications that do not depart from the spirit and scope of the invention are deemed to be covered by the invention which is limited only by the claims which follow.

What is claimed is:

1. A heating/dryer apparatus comprised of a mounting device having a base with a suction cup mounted therein and a flexible arm with a heating/dryer apparatus attached to said flexible arm wherein said heating/dryer apparatus is comprised of a casing having a top and a bottom, a heating element inside a tubular member incorporated in said casing near said bottom and frictionally engaged with said casing, a fan incorporated in a housing in said casing located above said heating element and frictionally engaged with said housing, and, an electrical extension containing electrical wiring adapted to activate said heating element and said fan, said heating/dryer apparatus being attached to the end of said flexible arm.

2. The apparatus as defined in claim 1 wherein said heating/dryer apparatus is removably attached to the end of said flexible arm.

3. The apparatus as defined in claim 1 wherein the components are combined in a one-piece construction with the power source cord exiting from said base.

\* \* \* \* \*